United States Patent
Martini

(10) Patent No.: US 8,732,828 B1
(45) Date of Patent: May 20, 2014

(54) REFERRER-SPECIFIC NETWORK MANAGEMENT

(71) Applicant: Phantom Technologies, Inc., San Diego, CA (US)

(72) Inventor: Paul Michael Martini, San Diego, CA (US)

(73) Assignee: Phantom Technologies, Inc., San Diego, CA (US)

( * ) Notice: Subject to any disclaimer, the term of this patent is extended or adjusted under 35 U.S.C. 154(b) by 0 days.

(21) Appl. No.: 13/906,265

(22) Filed: May 30, 2013

(51) Int. Cl.
*G06F 11/00* (2006.01)

(52) U.S. Cl.
USPC .............................................. 726/22; 726/23

(58) Field of Classification Search
CPC ............ H04L 63/1416; H04L 63/1408; H04L 63/1433; H04L 63/1483; H04L 63/1491; H04L 63/20; H04L 63/145; H04L 29/08072
USPC ........... 726/1, 22–30; 713/164–170; 709/219, 709/225, 229
See application file for complete search history.

(56) References Cited

U.S. PATENT DOCUMENTS

| 5,903,732 | A  | * | 5/1999 | Reed et al. | 709/229 |
| 8,495,212 | B2 | * | 7/2013 | Czyzewicz et al. | 709/225 |
| 2011/0161440 | A1 | * | 6/2011 | Juvet et al. | 709/206 |

OTHER PUBLICATIONS

Askmetafilter.com, "Block every shred of traffic from a referrer", Feb. 4, 2008, downloaded from the internet at http://ask.metafilter.com/82811/Block-every-shred-of-traffic-from-a-referrer on May 21, 2013, 4 pages.
NGINX "HttpRefererModule", downloaded from the internet at: http://wiki.nginx.org/HttpRefererModule on May 21, 2013, 3 pages.

* cited by examiner

*Primary Examiner* — Hosuk Song
(74) *Attorney, Agent, or Firm* — Fish & Richardson P.C.

(57) ABSTRACT

Methods and systems for providing destination-specific network management are described. One example method includes receiving from a client within a network, a request to access a resource associated with a destination address outside the network, the received request including referrer information; determining that the destination address corresponds to an unclassified destination; determining whether the received request's referrer information corresponds to a referrer entity that is included in a set of approved referrers; and selectively blocking the network request to access the resource at the destination address based upon a result of the determining.

30 Claims, 7 Drawing Sheets

REFERRER-SPECIFIC NETWORK MANAGEMENT

FIELD

This specification generally relates to providing referrer-specific network management in computer networks.

BACKGROUND

In enterprise and other computer networks, computers or other devices connected to an internal network may request data from remote servers connected to wider, public networks such as the Internet. In some cases, the computers may request web pages or other resources from the remote servers according to a networking protocol, such as, for example, Hypertext Transfer Protocol (HTTP). Some networking protocols, and HTTP in particular, include referrer information in a request that indicates a webpage or other resource through which the user has come to access the webpage or other resource. For example, in an HTTP scenario, when a client clicks on a link in a webpage, an HTTP GET request is sent to the server associated with the link. The HTTP GET request may include a referrer header indicating a Uniform Resource Locator (URL) associated with the page containing the link.

SUMMARY

In general, one aspect of the subject matter described in this specification may be embodied in systems, and methods performed by data processing apparatuses that include the actions of receiving from a client within a network, a request to access a resource associated with a destination address outside the network, the received request including referrer information; determining that the destination address corresponds to an unclassified destination; determining whether the received request's referrer information corresponds to a referrer entity that is included in a set of approved referrers; and selectively blocking the network request to access the resource at the destination address based upon a result of the determining.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
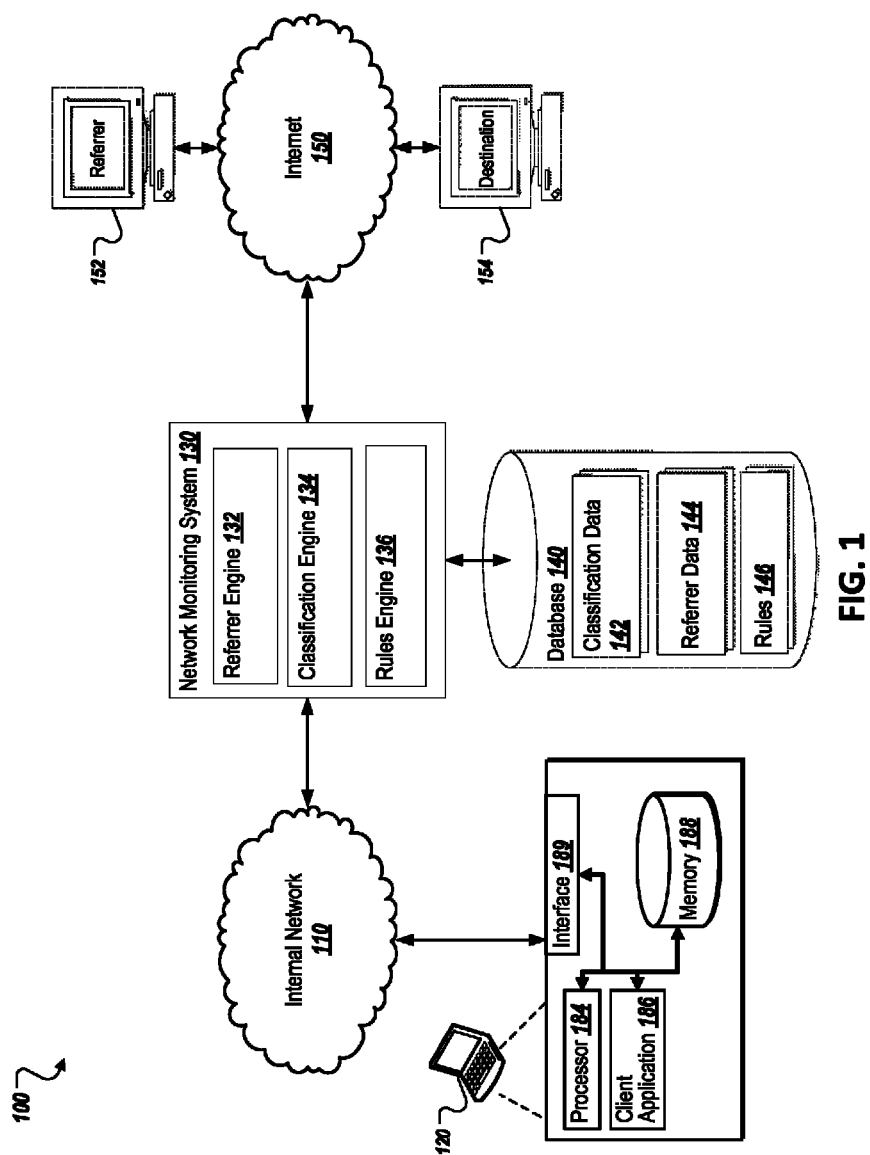
FIG. 1 is a diagram of an example environment.

An issue facing network owners today is unsolicited email containing links to malicious websites, such as malware or phishing websites. Often these links are disguised as legitimate links (e.g., by including misleading link text or long URLs that look legitimate at a glance, such as www.yourbank.com.badsite.com/bad.html) in order to induce a user to click the link and visit the malicious website. For example, an email may include a link with text reading "click here to visit Your Bank," while the URL of the link actually points to a fake version of the Your Bank web site which may inject malware to the user's computer or hijack the user's credentials.

In some implementations, the present solution takes advantage of a feature of HTTP called the "referrer" header, sometimes misspelled as "referer" in the HTTP documentation (see, e.g., http://www.w3.org/Protocols/HTTP/HTRQ_Headers.html). When a user requests a web page by clicking on a link in a web page, the referrer header in the HTTP GET request is populated so that the next web site can tell where the user came from. Typically, when a user follows a hijacked link that is embedded in an email that has a bad intention, the referrer header will not be populated or otherwise contain the URL of the web email server. By analyzing the referrer header information of requests on a network, instances can be identified in which a user has clicked on a link in an email or other document, and may block such requests if the web site being requested is not classified as a non-malicious web site (or conversely, if the site being requested is classified as a malicious web site). In some cases, the present solution may involve a security appliance or other computing device connected to the network.

In one example, a user may click on a malicious link in an email message in an email program. In response, the email program generates an HTTP GET request that includes the URL associated with the malicious link but does not, in this example, populate the referrer header. The solution may receive the HTTP GET request over the network, and determine that the referrer header is not present. The solution may then determine whether the URL is classified or not. Such classification may involve determining a category or other designation associated with the URL. For example, the URL for a search engine may be classified as a "search engine," and the URL for a baseball website may be classified as "sports." Malicious websites, such as those discussed previously, generally are unlikely to be classified as they are created and only used for a short time. If the solution detects that the URL is unclassified, it may block the request, thus refusing the user access to the malicious website.

The present solution may also enable a network owner to allow user access to an unclassified site based on the presence of a referrer header in a request. In this way, the network owner may allow a referring site (such as a search engine) to "vouch" for the veracity or safety of a site to which it has provided a link. In some implementations, the solution may be configured to allow access to unclassified sites when any referrer header is present (regardless of the referrer's identity), thus allowing access to unclassified sites as long as the request did not originate from an email message, or other document (e.g., a text file) or a URL manually entered into a browser (both of which may lead to a lack of a referrer header). The solution may also be configured such that the only certain classifications of web sites listed in the referrer header will allow a request to access an unclassified site. For example, a network owner may decide that any referrer header including a URL classified as a "search engine" should allow the associated request to an unclassified site to proceed. In some cases, the network owner may list certain sites that may refer to unclassified destinations. The solution may also allow the network owner to configure directly accessible destinations that can be accessed, regardless of classification, when the request does include a referrer header.

Although the present specification generally provides examples related to the HTTP network protocol, other protocols may be used as desired. For example, the present solution could be used with any suitable network protocol that provides referrer information in requests for resources.

The systems and techniques described here may provide several potential advantages. For example, a network owner may be provided with enhanced flexibility and control over the traffic travelling over the network, and on the web sites users on the network are able to visit, thereby reducing damage caused by malicious web sites. In addition, the problem of over-blocking legitimate unclassified sites may be alleviated. There may be a certain amount of lag time from when a web site is set up to when it is classified. By accepting a referrer header as proof that a site is legitimate, a certain amount of lag time (corresponding to a time from when a web site is set up to when it is classified) may, be reduced and access to legitimate, unclassified destinations may be facilitated.

FIG. 1 is a diagram of an example environment 100 for performing referrer-specific network management. As shown, the environment 100 includes an internal network 110. A client 120 is connected to the internal network 110. A network monitoring system 130 is also connected to the internal network 110 into the Internet 150. The network monitoring system 130 is also connected to a database 140 storing various data related to operation of the network monitoring system 130.

In operation, the network monitoring system 130 may receive requests from the client 120 for resources connected to the Internet 150, such as destination 154. The request received by the network monitoring system 130 may include referrer headers that include information about servers or other resources that have provided links to the request to destination, such as referrer 152. In some implementations, the network monitoring system 130 may perform a classification lookup on the requested destination 154. If the destination 154 is not classified, the network monitoring system may examine the referrer header in the request to determine a server or other entity that has provided a link to destination 154. In some cases, if the referrer 152 is an approved referrer, the network monitoring system 130 may allow the request for the destination 154 to proceed even though the destination 154 is unclassified.

In some implementations, the network monitoring system 130 may detect that the referrer header in the request is unpopulated, and thus no referrer information can be discerned for the request. In such a case, the network monitoring system 130 may determine whether the destination 154 corresponds to an unclassified destination or to a classified destination. The network monitoring system 130 may then block the request for the destination 154 if it is determined that the destination 154 is an unclassified destination. The network monitoring system 130 may also selectively permit the request for the destination 154 to proceed if it determines that the destination 154 is a directly accessible destination. In some cases, the directly accessible destination may be a destination that the network owner is determined is safe for a user to visit after clicking on a link in an email or after typing the URL into their browser manually.

As shown, the environment 100 includes an internal network 110. In some implementations, the internal network 110 may be a wireless network provided by a corporation, educational institution, municipality, business, or other entity. Such a wireless network may utilize any standard wireless networking technology, including 802.11a, 802.11b, 802.11g, 802.11n, LTE, WiMax, CDMA or any other suitable wireless networking technology. In such implementations, the wireless network may be a public network in the sense that any device within range may connect to the network. The internal network 110 may also be a wired network, such as an Ethernet network.

The environment 100 also includes a client 120. In some implementations, the client may be a mobile device, such as a cellular telephone, a smartphones, a tablet, a laptop or other similar computing device. The client may also be a wired devices such as a desktop computer. In some implementations, the client may be a personal devices associated with one or more users.

The client 120 may include an interface 189, a processor 187, a memory 188 and a client application 186. The client 120 may be used by a user to access destinations connected to the internal network 110 or to Internet 150, such as destination 154 and referrer 152. In some implementations, the client 120 may run network access or web browsing software (e.g., a web browser) for accessing resources on the Internet 150.

The environment 100 may also include Internet 150. In some implementations, the Internet 150 is the public Internet. The Internet 150 may also be any network or combination of networks accessible from the internal network 110. In such an implementation, the Internet 150 may be replaced by another network or combination of networks, which may be public, private, or a combination of the two. In some implementations, the Internet 150 is a distributed network utilizing the Transmission Control Protocol (TCP) in combination with HTTP to transmit requests to servers (such as destination 154) connected to the Internet 150, and to transmit responses from the servers to the requesting clients (such as client 120). The Internet 150 may provide connectivity from the internal network 110 to the destination 154.

Referrer 152 and destination 154 are shown connected to Internet 150. In some implementations, the referrer 152 and the destination 154 are servers connected to Internet 150. The referrer 152 may provide a webpage or other resource to the client 120 that includes a link or reference to the destination 154. For example, the referrer 152 may be a search engine that has indexed destination 154. The client 120 may access the referrer 152 and submit a search query. The referrer 152 may respond to the client 120 with a webpage including a list of search results, the list of search results including a link to destination 154. If the client 120 then activates this link on the search results page to destination 154, a request may be sent to the destination 154 including a referrer header indicating referrer 152. Referrer 152 may also be any website, program, database, directory, or any other resource that provides a link to destination 154 such that the request sent by client 120 for the destination 154 includes a referrer header indicating referrer 152.

The illustrated environment 100 also includes a network monitoring system 130. In some implementations, the network monitoring system 130 is a server connected to the internal network 110 that acts as a gateway between the internal network 110 and the Internet 150. In such a configuration, all network traffic to and from devices connected to the internal network 110 (such as client 120) and the Internet 150 passes through the network monitoring system 130. The network monitoring system 130 may function as a proxy server in such a configuration.

The network monitoring system 130 may also be arranged in a tap or span configuration, such that data from the internal network 110 does not flow through it, but instead the network monitoring system 130 monitors the data passively, such as by receiving notifications from another component of data transfers and other network activities.

The network monitoring system 130 may include referrer engine 132. In some implementations, the referrer engine 132 may examine the request received from the client 120 for the destination 154, and determine the referrer information from the request. For example, if the request is an HTTP GET message, the referrer engine 132 may parse the request and extract the referrer header from the request. In some cases, the referrer engine 132 may extract a URL or other identifier referring to the referrer 152. The referrer engine 132 may perform additional analysis on the extracted URL, including performing a trace route or other identification on the server the referrer information indicates. The referrer engine 132 may also consult the database 140 to retrieve configuration information associated with the referrer. For example, referrer engine 132 may consult the database 140 to determine whether the referrer is in a set of approved refers. In such a case, the referrer engine 132 may allow or instruct other components of the network monitoring system 130 to allow the request to continue. In some implementations, the referrer engine 132 may simply parse and extract the URL of the referrer from the request, and passed the information on to other components of the network monitoring system 130, such as the rules engine 136 and classification engine 134.

As shown, the network monitoring system 130 may also include a classification engine 134. In operation, the classification engine 134 may parse and extract the destination URL from the request received from the client 120 the classification engine 134 may then consult the database 140 to retrieve classification data 142 associated with the URL. For example, if destination 154 is a news site, the classification data 142 may indicate that the destination 154 is classified as news. Classification engine 134 may read this classification from the database 140 after expressing extracted URL. In some cases, the classification engine 134 may pass the classification information on to other components of the network monitoring system, such as the rules engine 136. In some cases, the clarification and 134 may determine, by consulting the database 140, that the URL present in a request is unclassified, and may communicate this to the rules engine 136.

As shown, the network monitoring system 130 also includes a rules engine 136. In operation, the rules engine 136 may analyze information associated with a received request, and determine how to handle the request by referring to rules 146 stored in the database 140. In some implementations, the rules engine receives as input referrer information from the referrer engine 132, and classification information from the classification engine 134. In some cases, the rules engine 136 may permit or block a request based on the configured rules in the database 140. For example, if one of the rules 146 indicates that unclassified destinations should be permitted if requests for them include a referrer classified as a search engine, the rules engine 136 would forward requests from the internal network 110 to the Internet 150 that matched the criteria. In another example, if the rules engine 136 is configured to block access to unclassified sites if requests do not contain referrer information, the rules engine 136 may return a response back to the requesting client indicating that the request was blocked in response to receiving a request matching these criteria.

In some implementations, the referrer engine 132, the classification engine 134, the rules engine 136 may be software programs executing on the network monitoring system 130, hardware components included inside the network monitoring system 130, external components accessed over a network by the network monitoring system 130, or any other suitable configuration or combination of configurations.

In the illustrated example, the network monitoring system 130 is connected to a database 140. In some implementations, the database 140 may be stored on the same server as the network monitoring system 130. The database 140 may also be stored on a separate server and accessed by the network monitoring system 130 over a network. The database 140 may be any proprietary or commercially available database system or format, including, but not limited to, MySQL®, Microsoft® SQLServer, IBM® DB2, Oracle®, SQLite, or any other suitable database system or format. The database 140 may also be a distributed database running on a plurality of servers. In some implementations, the database 140 may be a configuration file or set of configuration files associated with the network monitoring system 130. The network monitoring system 130 may examine these configuration files to determine the currently configured classification data, referrer data, and rules.

As shown, the database 140 includes classification data 142. In some implementations, the classification data 142 may include information placing different network resources into categories, for example, classification data may include a data mapping of a plurality of URLs into one or more classifications or categories. For example, a URL of www.mysearch.com may be classified as a search engine, whereas a URL of www.football.com may be classified as sports. In some implementations, the classification data may be included in a table or set of tables within the database 140. The class case data may be keyed by URL, by site name, or by any other appropriate identifier for a website.

The database 140 may also include referrer data 144. In some implementations, the referrer data 144 may include information on which refers are approved refers, and thus may provide access to unclassified sites. In some cases, the referrer data 144 may include a table or set of tables storing such configuration information. The referrer data 144 may also include information about the different refers, such as the name of the referring entity, contact information for the referring entity, a relationship of the network owner to the referring entity, or any other suitable information.

The database 140 may also include rules 146. In operation, the rules 146 are read by the rules engine 136 to determine how to handle requests for various network destinations, such as destination 154. In some cases, the rules 146 may include a set of trigger conditions indicating in what cases the rule should be applied. For example, an example rule may include a trigger condition stating that the rule should be triggered when a request is received with no referrer information for an unclassified destination. The rules 146 may also each include an action or set of actions to perform when the trigger condition is detected. For example, an example rule may include an action of block request, which indicates to the rules engine 136 that the request matching the trigger condition should be blocked.

Figure 2:
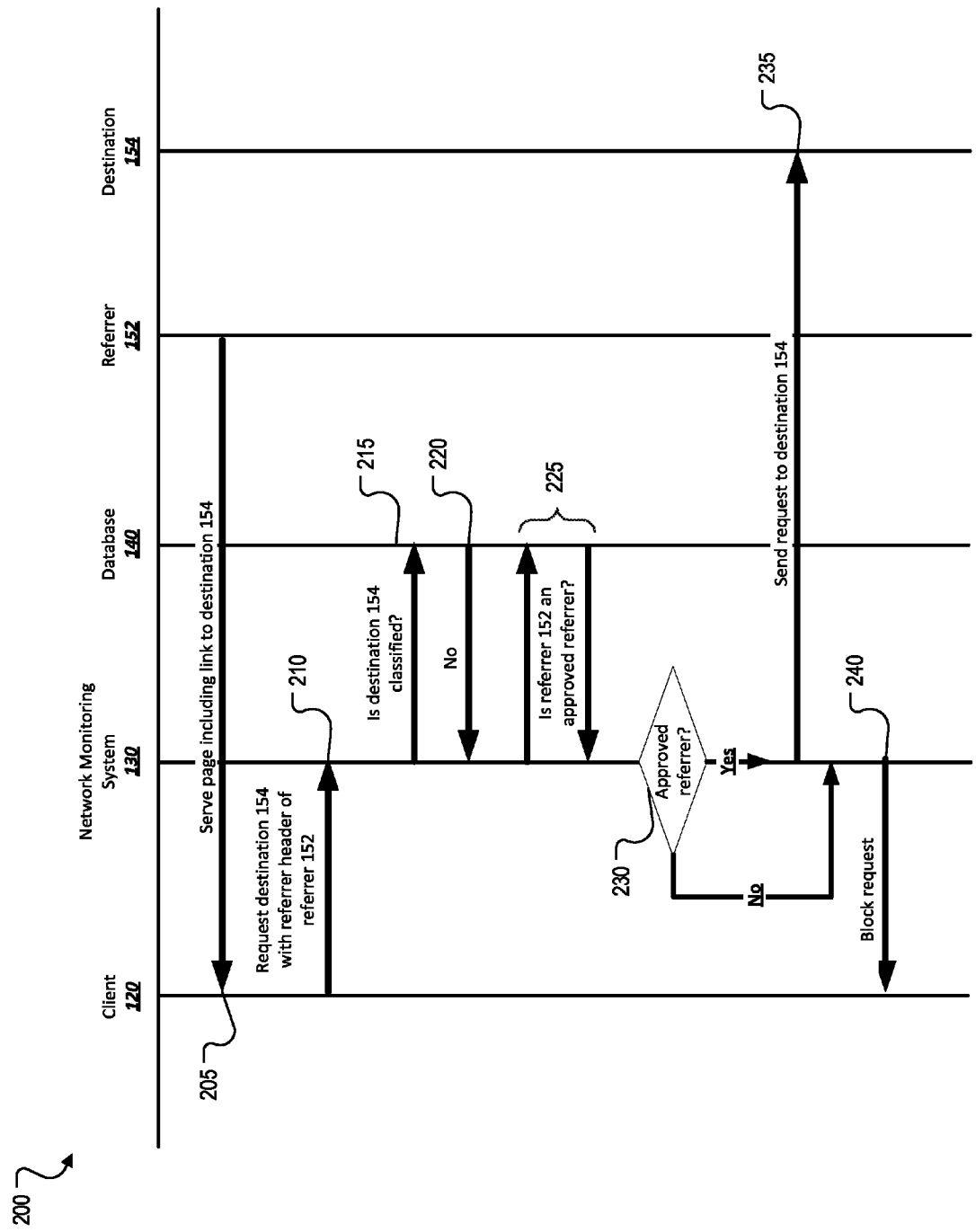
FIG. 2 is a message flow diagram of an example interaction between the components of the example network to perform referrer-specific network management in a scenario where a request includes referrer information.

FIG. 2 is a message flow diagram of an example interaction 200 between the components of the example environment to perform referrer-specific network management in a scenario where a request includes referrer information.

At 205, the referrer 152 serves a page to the client 120 including a link to destination 154. In some implementations, the served page may be a Hypertext Markup Language (HTML) page including a link to destination 154. At 210, the client 120 sends a request for the destination 154 with a referrer header indicating referrer 152. In some cases, the network monitoring system 130 may receive the request as shown in FIG. 2. In some implementations, such as a tap or span configuration, the network monitoring system 130 may receive only an indication that the request was sent over the network.

At 215, the network monitoring system 130 consults the database 140 to determine if destination 154 is classified. In some implementations, this determination is made by querying the database 140 for classification data 142 associated with the destination 154. At 220, the database 140 indicates that destination 154 is not classified.

At 225, the network monitoring system 130 queries the database 140 to determine if referrer 152 is an approved referrer. In some implementations, the network monitoring system 130 may query the referrer data 144 to determine if the referrer 152 is an approved referrer.

At 230, the network monitoring system 130 determines whether the referrer is an approved referrer. If the network monitoring system 130 determines that the referrer 152 is an approved referrer, the message flow continues to 235, where the network monitoring system 130 sends the request originally sent by the client 120 to the destination 154. In a tap or span configuration, this action may be omitted, as the network monitoring system may not have received the actual packet and may not be in the data path between the client 120 and the destination 154.

If the network monitoring system determines that the referrer is not an approved referrer at 230, the message flow continues to 240, where the network monitoring system blocks the request sent by the client 120. In some implementations, the network monitoring system 130 may send an indication to the client 120 that the request has been blocked. The network monitoring system 130 may also block the request by not forwarding it to the destination 154. In a tap or span configuration, the network monitoring system 130 may instruct another network component to block the request, to block the response from the destination 154, or any other suitable action.

Figure 3:
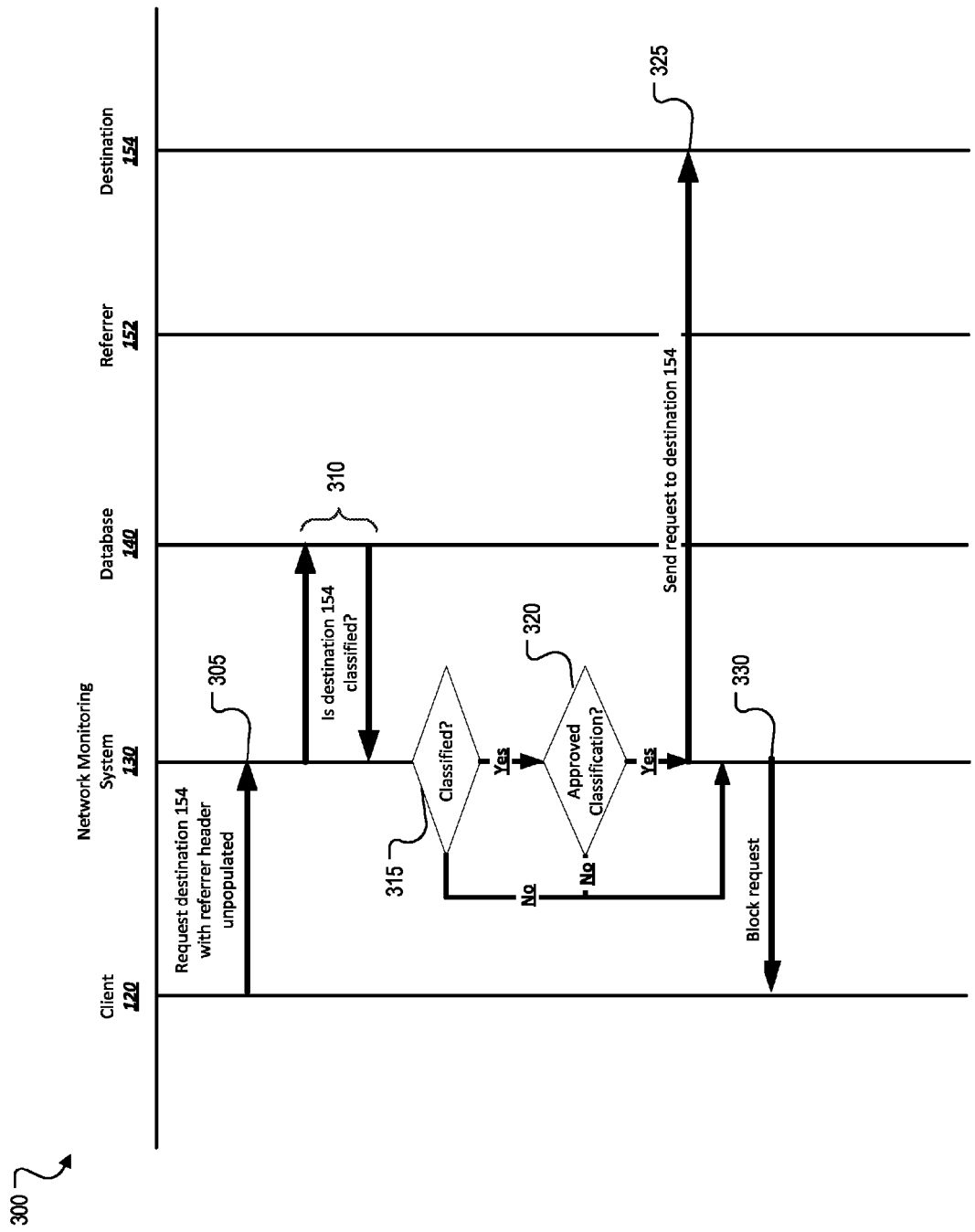
FIG. 3 is a message flow diagram of an example interaction between the components of the example network to perform referrer-specific network management in a scenario where a request does not include referrer information.

FIG. 3 is a message flow diagram of an example interaction between the components of the example network to perform referrer-specific network management in a scenario where a request does not include referrer information.

At 305, the client 120 sends a request for destination 154 with an unpopulated referrer header. In some implementations, the request may include a blank referrer header. The request may also omit the referrer header. The network monitoring system 130 receives the request and determines that the referrer header is unpopulated, as previously described relative to FIG. 1.

At 310, the network monitoring system 130 consults the database 140 to determine if destination 154 is classified. In some implementations, this determination is performed by querying the classification data 142 stored in the database 140. At 315, the network monitoring system determines whether destination 154 is classified. If the destination is classified the message flow continues to 320, where the network monitoring system 130 determines whether the classification associated with the destination 154 is an approved classification. In some implementations, the network monitoring system 130 may perform another database query to determine if the classification is approved. The network monitoring system 130 may also consult the data returned from the original query at 310 to make this determination.

If the classification determined to be approved at 320, the message flow continues to 325, where the network monitoring system 130 sends the original request from the client 120 to the destination 154. As previously discussed, in a tap or span configurations, the step may be omitted.

If the determination at 315 or the determination at 320 is determined in the negative, the message flow continues to 330, with the network monitoring system 130 blocks the request from the client 120 to the destination 154. As previously discussed, blocking the request may include the network monitoring system 130 sending an indication to the client 120 that the request has been blocked. In a tap or span configuration, the network monitoring system 130 may instruct another network component to block the request, block the responses from the destination 154, or any other suitable action.

Figure 4:
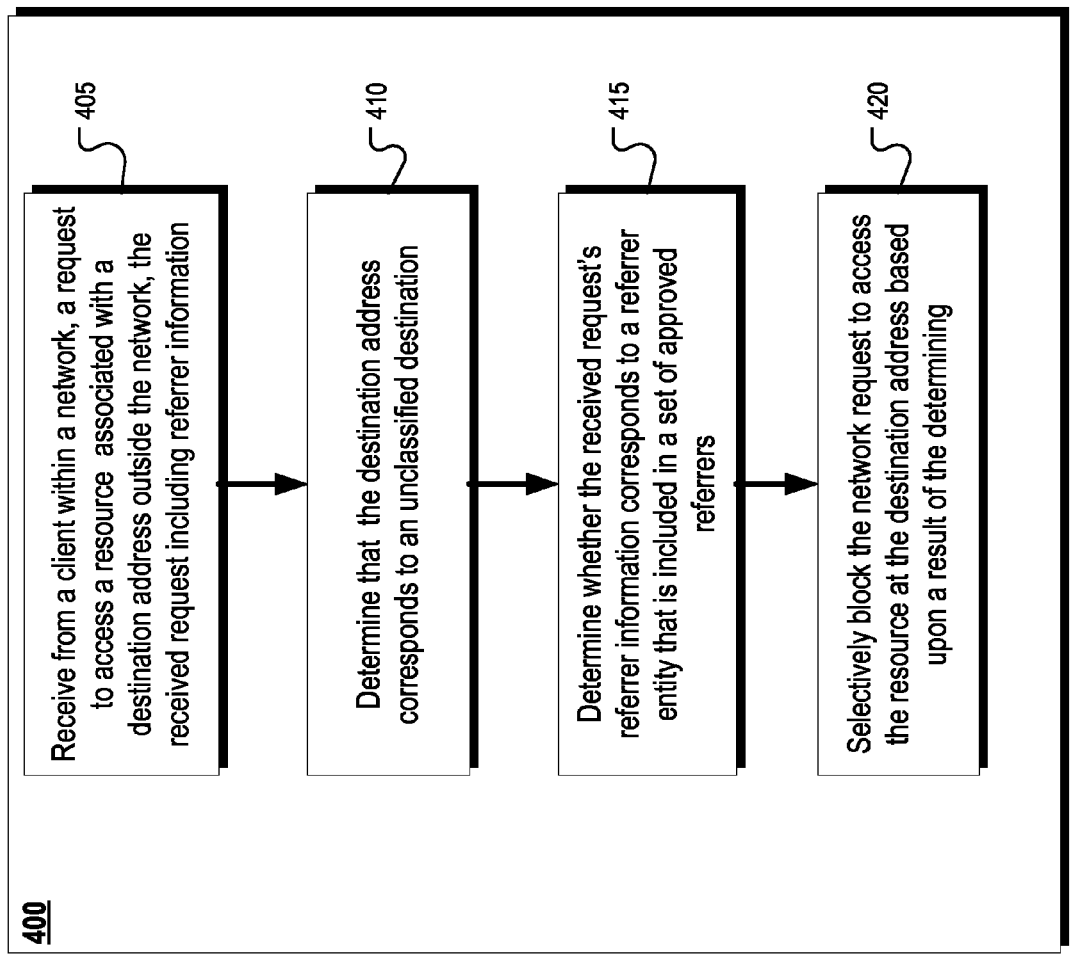
FIG. 4 is a flow chart of an example process of performing referrer-specific network management.

FIG. 4 is a flow chart of an example process of performing referrer-specific network management. At 405, a request to access a resource associated with the destination that is outside the network is received from a client within the network, the received request including referrer information. At 410, it is determined that the destination address corresponds to an unclassified destination. In some implementations, this determination may be performed by consulting a database (e.g., 140) containing classification data (e.g., 142).

At 415, is determine whether the receive requests referrer information corresponds to referrer entity that is included in a set of approved referrers. In some implementations, this determination may be performed by consulting a database (e.g., 140) containing referrer information (e.g., 144).

At 420, the network request to access the resource of the destination address is selectively blocked based upon a result of the determining. In some implementations, if the referrer entity is included in the set of approved refers, the network request may be permitted to proceed. If the referrer entity is not included in the set of approved refers, the network request may be blocked.

In some implementations, the set of approved referrers is defined as referrers having certain classifications. For example, the set of approved refers may include all referrers classified as search engines. The set of approved refers may also include specific web pages or websites. In some implementations, these webpages and websites are specified by URLs.

Figure 5:
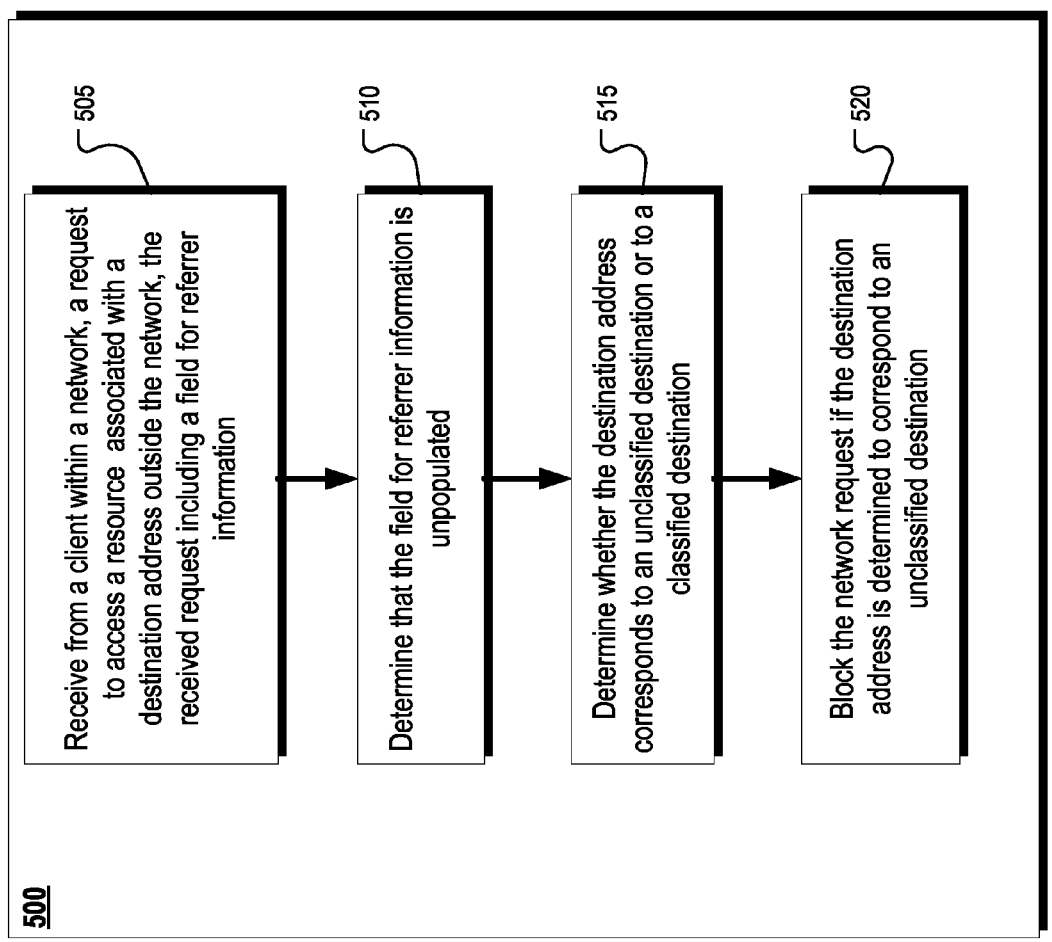
FIG. 5 is a flow chart of an example process of performing referrer-specific network management when referrer information is unpopulated in a request.

FIG. 5 is a flow chart of an example process of performing referrer-specific network management when referrer information is unpopulated in a request.

At 505, a request access a resource associated with the destination address outside the network is received from a client within the network, the received request including a field for referrer information. At 510, is determined that the field for referrer information is unpopulated. In some implementations, the field for referrer information may be blank or contain a null value. The field for referrer information may also be omitted from the request to indicate that the field is unpopulated.

At 515, it is determined whether the destination address corresponds to an unclassified destination or to a classified destination. As previously discussed, this determination may be made by consulting a database (e.g., 140) containing classification data (e.g., 142). At 520, the network request is blocked if the destination that is determined to correspond to an unclassified destination.

Figure 6:
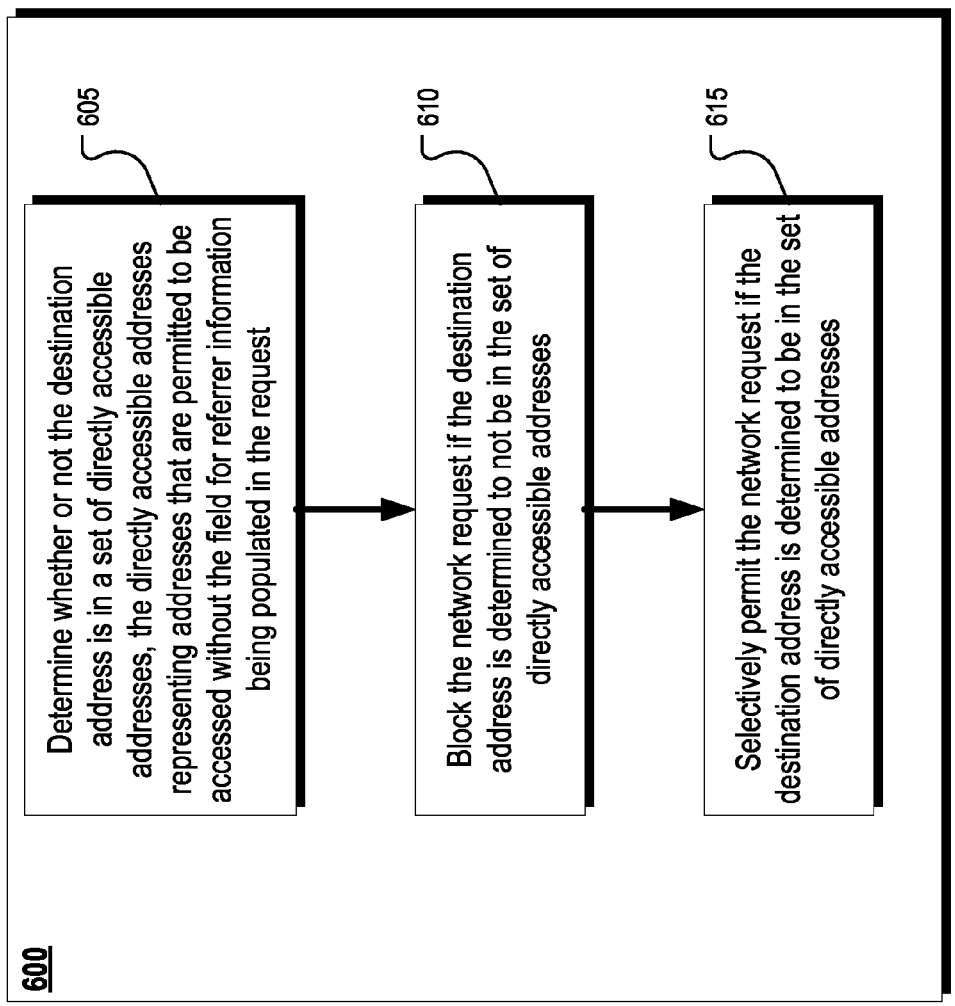
FIG. 6 is a flow chart of an example process of performing referrer-specific network management including consulting a set of directly accessible addresses.

FIG. 6 is a flow chart of an example process of performing referrer-specific network management including consulting a set of directly accessible addresses. At 605, it is determined whether or not the destination address is in a set of directly accessible addresses, the directly accessible addresses representing addresses that are permitted to be accessed without the field for referrer information being populated in the request. In some implementations, the set of directly accessible addresses are addresses the network owner has determined are safe for users to access. By including these addresses in the set of directly accessible addresses, the network owner allows users to access the sites in ways that will not generate referrer information. For example, if the user clicks on a link in an email to directly accessible site, the generated request may not include referrer information. However since the site is a directly accessible site, the request may not be blocked. In another example, the user may enter the URL of the directly accessible site directly into their browser and browse to the site. Although such an interaction may not generate referrer information, the request may not be blocked.

At 610, the network request is blocked of the destination matters determined to not be in the set of directly accessible addresses. At 615, the network request is selectively permitted if the destination address is determined to be in the set of directly accessible addresses. In some implementations, a request for a directly accessible address may be blocked due to other configurations, such as, for example, the directly accessible addresses belonging to a prohibited classification (such as malware).

Figure 7:
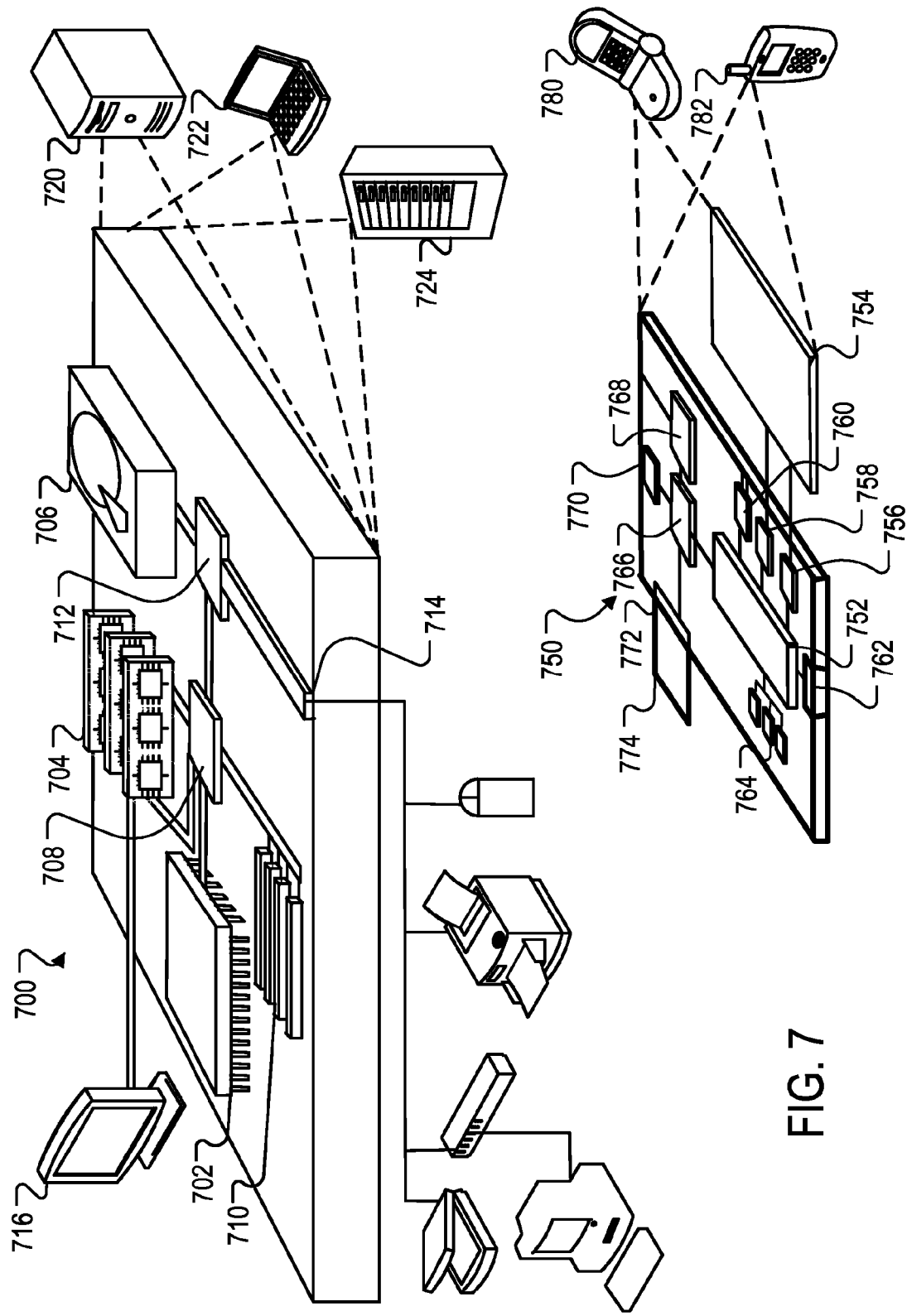
FIG. 7 is a diagram of computing devices that may be used to implement the systems and methods described in this document.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed interface 708 manages bandwidth-intensive operations for the computing device 700, while the low speed interface 712 manages lower bandwidth-intensive operations. Such allocation of functions is exemplary only. In one implementation, the high-speed interface 708 is coupled to memory 704, display 716 (e.g., through a graphics processor or accelerator), and to high-speed expansion ports 710, which may accept various expansion cards (not shown). In the implementation, low-speed interface 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 752 may be a CISC (Complex Instruction Set Computers) processor, a RISC (Reduced Instruction Set Computer) processor, or an MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory 764 may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user, as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front-end components. The components of the system can be interconnected by any form or medium of digital data communication (e.g., a communication network). Examples of communication networks include a local area network ("LAN"), a wide area network ("WAN"), peer-topeer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method executed by one or more processors, the method comprising:
    receiving from a client within a network, a request to access a resource associated with a destination address outside the network, the received request including referrer information;
    determining that the destination address corresponds to an unclassified destination;
    determining whether the received request's referrer information corresponds to a referrer entity that is included in a set of approved referrers; and
    selectively blocking the network request to access the resource at the destination address based upon determining whether the received request's referrer information corresponds to a referrer entity that is included in a set of approved referrers.

2. The method of claim 1, wherein the network request is a HyperText Transfer Protocol (HTTP) request and the referrer information is an HTTP referrer header.

3. The method of claim 1, wherein the set of approved referrers includes referrer entities associated with approved categories.

4. The method of claim 3, wherein the approved categories include a search engine category.

5. The method of claim 1, further comprising:
    determining that the referrer information represents a referrer entity that is included in a set of disapproved referrers; and
    blocking the network request from proceeding to the unclassified destination upon determining that the referrer information represents a referrer entity that is included in a set of disapproved referrers.

6. The method of claim 1, further comprising:
    determining that the referrer information represents an unclassified referrer entity; and
    blocking the network request from proceeding to the unclassified destination upon determining that the referrer information represents the unclassified referrer entity.

7. The method of claim 1, further comprising:
    determining that the referrer information does not represent a referrer entity; and
    blocking the network request from proceeding to the unclassified destination upon determining that the referrer information does not represent a referrer entity.

8. The method of claim 1, wherein the network request is generated by a web browser program upon activation of a link in a search results page, and the referrer information represents a search engine that provided the search results page.

9. The method of claim 1, wherein the network request is generated by an email program upon activation of a link in an email message, and the referrer information does not represent a referrer entity.

10. The method of claim 1, wherein the network request is generated by a web browser program upon entry of a destination address, and the referrer information does not represent a referrer entity.

11. A computer-implemented method executed by one of more processors, the method comprising:
    receiving from a client within a network, a request to access a resource associated with a destination address outside the network, the received request including a field for referrer information;
    determining that the field for referrer information is unpopulated;
    determining whether the destination address corresponds to an unclassified destination or to a classified destination; and
    blocking the network request based at least in part upon determining that the field for referrer information is unpopulated and determining that the destination address corresponds to an unclassified destination.

12. The method of claim 11, further comprising selectively blocking the network request to access the resource at the destination address if the destination address is determined to correspond to a classified destination.

13. The method of claim 11, further comprising:
    determining whether or not the destination address is in a set of directly accessible addresses, the directly accessible addresses representing addresses that are permitted to be accessed without the field for referrer information being populated in the request; and
    blocking the network request if the destination address is determined to not be in the set of directly accessible addresses.

14. The method of claim 13, further comprising selectively permitting the network request if the destination address is determined to be in the set of directly accessible addresses.

15. The method of claim 11, wherein the network request is a HyperText Transfer Protocol (HTTP) request and the referrer information is an HTTP referrer header.

16. The method of claim 11, wherein the network request is generated by a web browser program upon activation of a link in a search results page, and the referrer information represents a search engine that provided the search results page.

17. The method of claim 11, wherein the network request is generated by an email program upon activation of a link in an email message, and the referrer information does not represent a referrer entity.

18. The method of claim 11, wherein the network request is generated by a web browser program upon entry of a destination address, and the referrer information does not represent a referrer entity.

19. A system comprising:
    a processor configured to execute computer program instructions; and
    a computer storage medium encoded with computer program instructions that, when executed by the processor, cause the system to perform operations comprising:
        receiving from a client within a network, a request to access a resource associated with a destination address outside the network, the received request including referrer information;
        determining that the destination address corresponds to an unclassified destination;

determining whether the received request's referrer information corresponds to a referrer entity that is included in a set of approved referrers; and selectively blocking the network request to access the resource at the destination address based upon determining whether the received request's referrer information corresponds to the referrer entity that is included in the set of approved referrers.

20. The system of claim 19, wherein the network request is a HyperText Transfer Protocol (HTTP) request and the referrer information is an HTTP referrer header.

21. The system of claim 19, wherein the set of approved referrers includes referrer entities associated with approved categories.

22. The system of claim 21, wherein the approved categories include a search engine category.

23. The system of claim 19, the operations further comprising:

determining that the referrer information represents a referrer entity that is included in a set of disapproved referrers; and blocking the network request from proceeding to the unclassified destination upon determining that the referrer information represents a referrer entity that is included in a set of disapproved referrers.

24. The system of claim 19, the operations further comprising:

determining that the referrer information represents an unclassified referrer entity; and blocking the network request from proceeding to the unclassified destination upon determining that the referrer information represents the unclassified referrer entity.

25. A system comprising:

a processor configured to execute computer program instructions; and a computer storage medium encoded with computer program instructions that, when executed by the processor, cause the system to perform operations comprising:

receiving from a client within a network, a request to access a resource associated with a destination address outside the network, the received request including a field for referrer information;

determining that the field for referrer information is unpopulated;

determining whether the destination address corresponds to an unclassified destination or to a classified destination; and blocking the network request based at least in part upon determining that the field for referrer information is unpopulated and determining that the destination address corresponds to an unclassified destination.

26. The system of claim 25, the operations further comprising selectively blocking the network request to access the resource at the destination address if the destination address is determined to correspond to a classified destination.

27. The system of claim 25, the operations further comprising:

determining whether or not the destination address is in a set of directly accessible addresses, the directly accessible addresses representing addresses that are permitted to be accessed without the field for referrer information being populated in the request; and blocking the network request if the destination address is determined to not be in the set of directly accessible addresses.

28. The system of claim 27, the operations further comprising selectively permitting the network request if the destination address is determined to be in the set of directly accessible addresses.

29. The system of claim 25, wherein the network request is a HyperText Transfer Protocol (HTTP) request and the referrer information is an HTTP referrer header.

30. The system of claim 25, wherein the network request is generated by a web browser program upon activation of a link in a search results page, and the referrer information represents a search engine that provided the search results page.

* * * * *